United States Patent [19]

Borradori

[11] 4,095,826
[45] Jun. 20, 1978

[54] CONNECTOR FOR RIGID PLASTICS PIPES

[75] Inventor: Elio Borradori, Lugano, Switzerland

[73] Assignee: Endermill Anstalt, Liechtenstein

[21] Appl. No.: 745,775

[22] Filed: Nov. 29, 1976

[30] Foreign Application Priority Data

Dec. 1, 1975 Switzerland .................. 015593/75

[51] Int. Cl.² ........................................... F16L 21/06
[52] U.S. Cl. .................................. 285/330; 285/369;
285/382.7; 285/423
[58] Field of Search ................... 285/249, 382.7, 342,
285/328, 343, 341, 330, 369, 423, 323

[56] References Cited

U.S. PATENT DOCUMENTS

| 1,098,294 | 5/1914 | Patty | 285/249 |
|---|---|---|---|
| 1,955,642 | 4/1934 | Laughlin | 285/328 X |
| 2,453,024 | 11/1948 | Lomelino | 285/343 |
| 2,466,526 | 4/1949 | Wolfram | 285/382.7 X |
| 2,490,620 | 12/1949 | Cole et al. | 285/382.7 X |
| 2,585,453 | 2/1952 | Gallagher et al. | 285/382.7 X |
| 3,109,052 | 10/1963 | Dumire et al. | 285/341 X |
| 3,606,396 | 9/1971 | Prosdocimo | 285/382.7 X |
| 3,980,325 | 9/1976 | Robertson | 285/382.7 X |

FOREIGN PATENT DOCUMENTS 2,421,470   11/1975   Germany ........................ 285/342

Primary Examiner—Thomas F. Callaghan
Attorney, Agent, or Firm—Brisebois & Kruger

[57] ABSTRACT

Connector for rigid plastic pipes comprises a central cylindrical member wherein the axial bore widens at its two opposite ends to form three portions of predeterminal length and of different diameters, there being provided at each end a pair of semi-circular locking inserts provided internally with suitable toothing, and forming a contractable cylindrical seat adapted to lock both axially and torsionally the pipe inserted therein.

9 Claims, 5 Drawing Figures

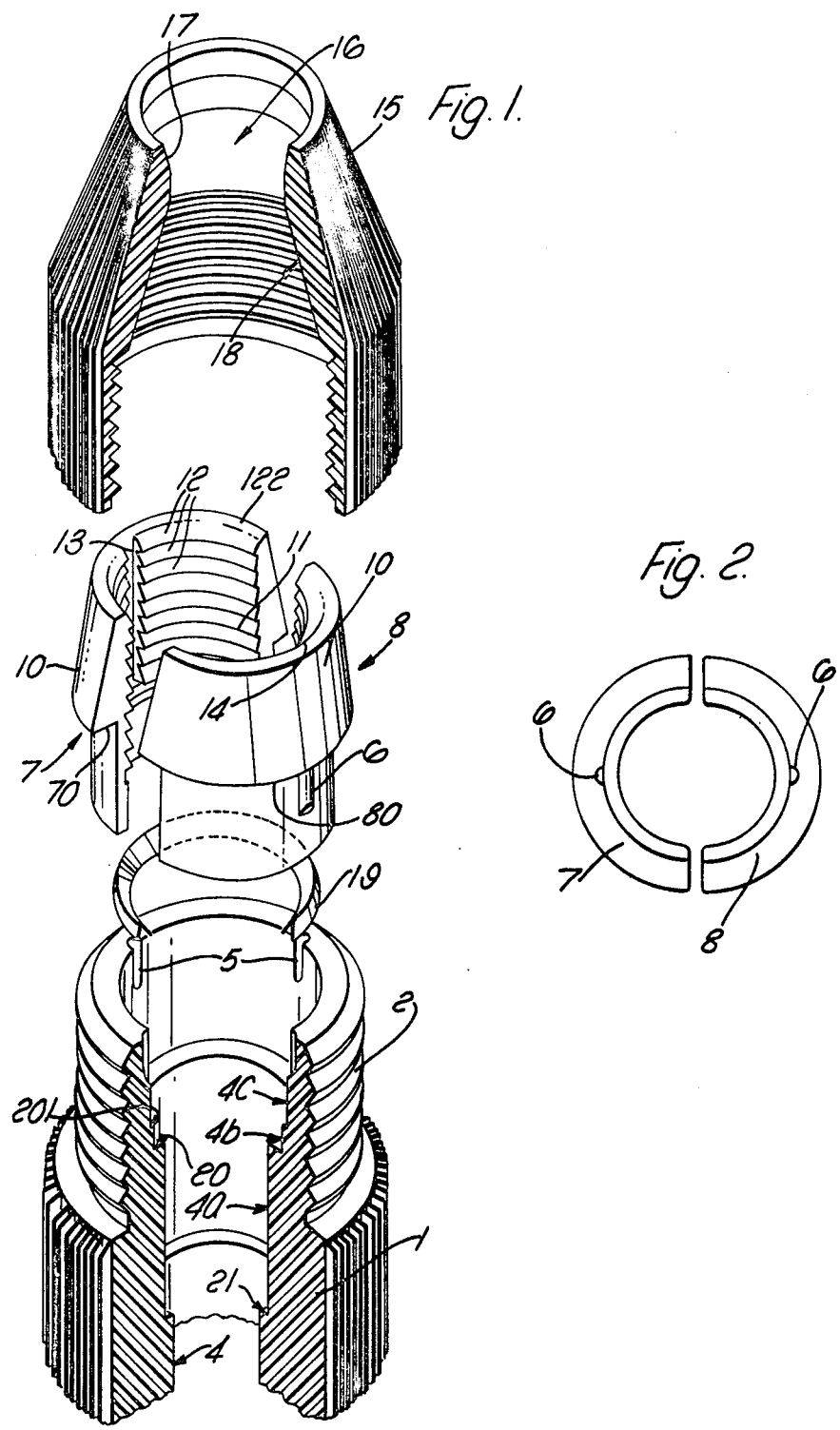

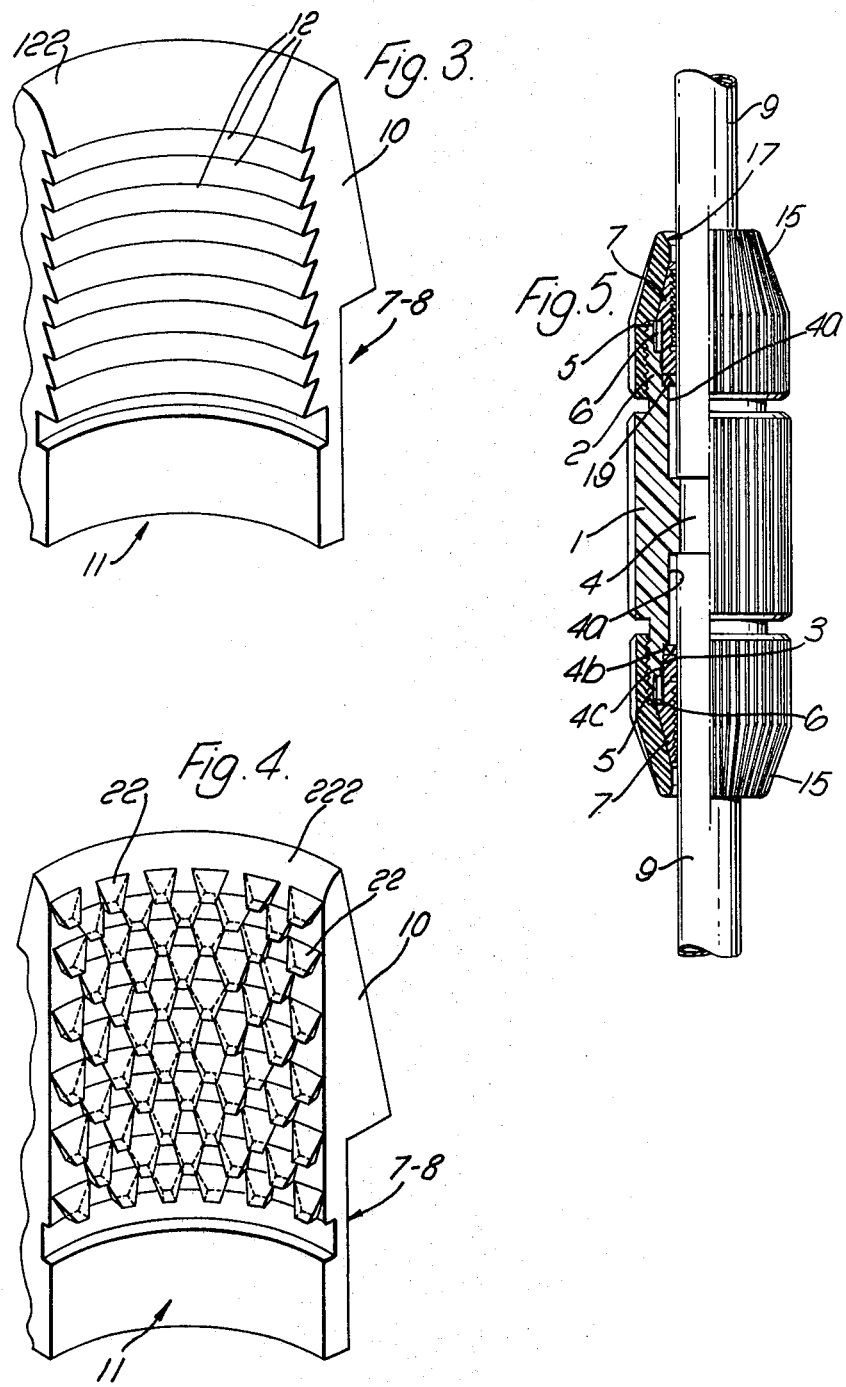

CONNECTOR FOR RIGID PLASTICS PIPES

SUMMARY OF THE INVENTION

Rigid metal or rigid extruded synthetics pipes with smooth ends notably present difficulties in use deriving from the need to create butt joints for the various pipe lengths which are suitable to resist the high working pressures, and which at the same time ensure that the connected pipe lengths maintain a constant relative position, are quick to assemble and are economical to construct.

The known connectors in this field all present a series of operating and constructional problems which it is most desirable to solve because of the extensive expansion in the use of extruded resin pipes.

In particular, known connectors present sealing deficiencies at high pressure, and are of such a configuration as to require mechanical machining by machine tools which negatively influence their cost.

Finally, known connectors are unsuitable for keeping the rotational position of the pipes constant, i.e. they are unable to lock said pipes against torsion.

The present invention relates to connectors of the type comprising a cylindrical member inside which the pipe is to be locked, a resiliently expandable ring nut arranged for insertion into said member and an external sleeve or ring nut arranged for screwing on to said member to internally press and squeeze said resiliently expandable ring nut.

In known designs, said external member internally comprises annular grooves arranged to contain gaskets for fluid sealing against the pipe inserted therein.

Further, in known designs the resiliently expandable ring nut is in the form of a ring cut along a generating line, or otherwise in the form of several sectors separated from each other and disposed to form an annular structure.

As stated, none of the known structures is able to lock sufficiently against high pressure.

Moreover, the structural characteristics of many of the known constructions are such as to require annular cavities to be formed by machine tool operations, for containing seal rings.

Finally, none of the known constructions comprises devices or configurations which ensure perfect torsional locking of the pipes.

From the operational aspect, in the aforementioned known connectors it is difficult to insert the pipe because of the presence of the gaskets previously placed in the grooves and projecting towards the interior of the connector.

The object of the present invention is to propose and provide a connector for smooth-ended pipes of rigid material such as extruded synthetic material, in which the aforementioned disadvantages inherent in known connectors of the type specified heretofore are absent.

This is obtained according to the invention by the use of a particular type of deformable ring nut adapted to squeeze the pipe in combination with a special external member, the configuration of which is such that, when in combination with said deformable ring nut, the desired results are obtained.

In particular, an active interaction is created between the external member and ring nut which manifests itself substantially in an improved distribution of forces over the ring nut and between the ring nut and pipe, aided by the squeezing effect of the external ring nut or sleeve.

The aforementioned combined effect between the various parts of the connector, which greatly increases the effectiveness on the pipe to be squeezed, has enabled surprising performance characteristics to be obtained relative to those of known connectors, for equal connector sizes.

The detailed concept on which the present invention is based is the use of a main connector member one end of which is externally threaded, and which, starting from said end, is configured internally in the form of a first cylindrical portion with its edge provided with internal axial cuts.

At the base of said first portion there is provided a first shoulder with a sharp edged rim from which a second portion of smaller diameter begins, and of height equal to the height of the gaskets. A second sharp edged corner at the base of said portion leads to a portion of diameter equal to the outer diameter of the pipe to be locked in the connector.

At the base of this third portion, a further sharp edged shoulder acts as an abutment and support seat for the inserted pipe.

According to the invention, a gasket ring is rested on the first shoulder, of rounded rim.

According to the invention, said ring is conveniently of the lip type, with said lip extending along a direction to facilitate insertion and oppose withdrawal of the pipe, or alternatively said ring may be of simple circular cross-section.

Two symmetrical parts of shell configuration, and arranged to mate to form a cylindrically based member, with the top projecting and shaped externally in the form of a cone frustum, are arranged to be inserted into the first portion of the main connector member, to rest on the said annular gasket.

Below the projecting part of each half-shell, there is provided a projecting tooth arranged to be inserted into one of the peripheral cuts in the edge of the main connector member.

The interior of each half-shell comprises at least two sets of sawtooth ribs with sharp edges, and separated by a straight groove, their purpose being to lock the pipe torsionally and axially.

Alternatively, for the same purpose the invention provides a scaly relief surface with the sharp edges of the scales pointing downwards.

Each half-shell upperly comprises a conical lead-in to facilitate insertion of the pipe.

An upper ring nut or sleeve is screwed for squeezing purposes on the outside of the main connector member.

Said ring nut comprises internally a part shaped as a cone frustum, which mates with the upper widened part of the two said half-shells to squeeze them.

According to the invention, the tightening action which follows causes irregular symmetrical deformations in the two half-shells which result in an improved axial and especially torsional locking of the pipe.

Only one half of the main connector member has been described, this half being for locking the end of one pipe, but said main connector member also comprises a second half which is substantially symmetrical with the first, but which would be of different size, or be replaced by a different device, for example a cock.

The merits and operational and constructional characteristics of the invention will be more evident from the detailed description given hereinafter with reference to the figures of the accompanying drawings which illustrate one particular preferred embodiment by way of non-limiting example, and in which:

FIG. 1 is a perspective exploded partially sectional view of one half of the connector according to the invention, the second half not shown on the figure being equal to the first.

FIG. 2 is a detailed view of the ring-shaped locking sectors been from below;

FIGS. 3 and 4 are two preferred embodiments of the said locking sectors;

FIG. 5 is a longitudinal right section through two rigid plastics pipes assembled by the connector according to the invention, this latter here shown complete.

With reference to the said figures and in particular FIGS. 1, 2, 3 and 5, the connector for rigid plastics pipes consists of a central cylindrical member 1 with its two ends 2 and 3 externally threaded, and provided internally with a cylindrical axial bore 4, which widens towards the opposing outlets for predetermined heights and at different diameters 4a, 4b and 4c.

Four grooves 5 disposed on two diametrical and mutually orthogonal axes are provided along the circumference of the upper larger diameter 4c, and extend vertically for about one half the height of said bore 4c.

These grooves 5 form the engagement seat for the complementary ribs 6 provided on the outside diameter of a pair of locking inserts 7 and 8 of semi-circular rim section.

The purpose of the said semi-circular inserts is to lock the rigid plastics pipes 9 both axially and torsionally.

In this respect, when these said inserts have been inserted into the cylindrical seat 4c, they define, on mating, a single approximately cylindrical member the upper end 10 of which tapers in the form of a cone frustum, its inner axial bore 11 being covered upperly for about two thirds of its height by circumferential parallel sawtooth toothing 12.

In the vicinity of the upper end, the toothing 12 gives way to a flared lead-in portion 122.

The toothing of each insert 7 and 8 is traversed by a central vertical cut 13 and 14, the purpose of which is to allow the insert to aid the torsional and axial locking of the pipe 9 when the two inserts 7 and 8, previously inserted into the bore 4b and torsionally locked by the engagement of the ribs 6 in an opposing pair of grooves 5, are tightened by a female member 15 screwed on to the end thread 2 or 3 of the central cylindrical member 1.

This female element 15, of approximately cone frustum shape, has an inner axial bore 16 which is a mirror image of the outer profile of the member itself, the upper end 17 of which is in the form of a funnel to aid the introduction of the pipe 9 to be locked. This funnel configuration then widens into an inverted cone frustum bore 18 of the same inclination as the wall 10 of the sectors 7 and 8, and forming the pressure surface acting on said inserts 7 and 8 to cause locking of the plastics pipe 9 by the contraction of the bore formed by these inserts.

The connector is sealed by interposing a lip gasket 19 or an annular gasket (not shown) between the circular base of the two inserts 7 and 8 and the abutment 20 of the central axial bore 4b.

The bore 4c could be conveniently slightly flared outwards, while preserving its cylindrical base.

The abutment 201 between the bore 4b and bore 4c prevents the two inserts 7 and 8 from pressing on the gasket 19 and deforming it.

Alternatively, the abutment 201 between the pipe portions 4c and 4b could be replaced by abutments 70 and 80 provided on the pieces 7 and 8 to prevent their complete insertion into the portion 4c, and hence prevent them coming into contact with the gasket 19.

Evidently, the length of the lower cylindrical portion of the inserts 7 and 8 must be conveniently less than the length of the portion 4c, so as to leave a height free between the base of the inserts and the abutment 20 which is greater or equal to the height of the gasket.

The abutment 21 of the axial bore 4a defines the contact surface for the pipe 9 when this is inserted into the cylindrical member 1.

The aforesaid is evidently valid for each end of the connector for rigid material pipes, the one being complementary to the other in the case of symmetrical connectors.

FIG. 4 shows a possible modification of the toothing provided on the inner diameter of the two locking inserts 7 and 8.

This figure shows the toothing consisting of a plurality of saw teeth 22 disposed in circumferential parallel rows and mutually staggered on adjacent rows.

In a further preferred embodiment of this latter form of toothing, the teeth 22 are disposed along a spiroidal path on the generating walls of the bore 11.

In either case, there is provided an upper flared portion 222 as a lead-in for inserting the pipe.

The connector illustrated and described is evidently suitable for use in joining two coaxial pipes, but this does not constitute a constraint as it could also be used for joining two or more pipes disposed in different attitudes to satisfy the most widespread requirements.

To this end, the central member 1 is given the required shape, which could for example be "L", "T", "Y", "I" or other shapes.

Finally, because of the proposed configuration, and in particular because of the lead-ins 122 and 222, and the comparatively large axial length of the shells 10 relative to the corresponding elements of known connectors, and which enable the pipe to be "guided" during insertion, the pipe may always be inserted axially into the connector without dismantling this latter, so facilitating operational speed.

The invention is not limited to the single embodiment heretofore described, and modifications and improvements may be made thereto without leaving the scope of the invention, the fundamental characteristics of which are summarised in the following claims.

What is claimed is:

1. A connector for rigid plastic pipe comprising a central cylindrical member with an axial bore in the form of three stepped diameters which increase symmetrically from the centre of the member to its respective ends, and into which are inserted the rigid pipes to be connected, the two opposing ends of the cylindrical member being provided with an outer thread, two female elements threaded on said member and each having internally, a cone frustum cavity forming a radial pressure surface, a pair of internally toothed semi-circular locking segments positioned in each end of said member and engageable by said pressure surface of said female element for, forming a contractable cylindrical seat adapted to lock both axially and torsionally the pipe inserted therein, interengaging complimentary recess and projection means on the inner ends of said central member and on the outer wall of each of said locking segments respectively to torsionally constrain both said segments against rotation relative to said members, and cooperating abutment means on each of the segments and the member to prevent axial movement of the segments with respect to the member.

2. A connector according to claim 1 wherein said recess and projection means comprises axially extending recesses in the outermost step of the bore of the cylindrical member, each recess having an end opening through the end of said bore and a length of approximately one half the length of the bore, and ribs on said locking segments and extending into said recesses to prevent rotation of the segments.

3. A connector according to claim 1 wherein said locking segments each comprise, an interior semi-circular pipe engaging wall, and an outer flared mouth to facilitate inserting a pipe therethrough, said wall having sawtooth teeth extending along approximately two-thirds of its length, and a central axial cut interrupting said teeth, said cylindrical member further comprising axially extending external serrations to facilitate manual gripping.

4. A connector according to claim 3 wherein said sawtooth teeth extend in parallel concentric rows along each segment in a regularly staggered fashion to create a scale effect, assuring gripping and penetration of the pipe surface despite dirt on the pipe which could prevent effective locking.

5. A connector according to claim 2 wherein, said female elements each comprise, a body having an internal tapered surface for engaging external tapered surfaces of said locking segments, and a diverging conical mouth to facilitate insertion of the pipe.

6. A connector according to claim 5 wherein, said female elements each comprise, longitudinal serrations to facilitate manual gripping.

7. A connector according to claim 1, further comprising, a gasket for sealing between the cylindrical member and the external wall of the pipe, said gasket being positioned between the inner end of the bore containing the locking segments and an end face of the locking segments, said cooperating abutment means on said locking segments and said cylindrical member engaging to prevent and substantial axial compression of said gasket.

8. A connector according to claim 7, wherein said gasket has a sealing lip engaging the external wall of the pipe.

9. A connector according to claim 7 wherein said abutment means comprises a shoulder between the ends of each locking segment, and an end face of the bore into which the segment extends, said end face engaging said shoulder to prevent compression of the seal gasket.

* * * * *